2 Sheets—Sheet 2.
J. F. STEWARD.
GRAIN-BINDER.
No. 191,264. Patented May 29, 1877.
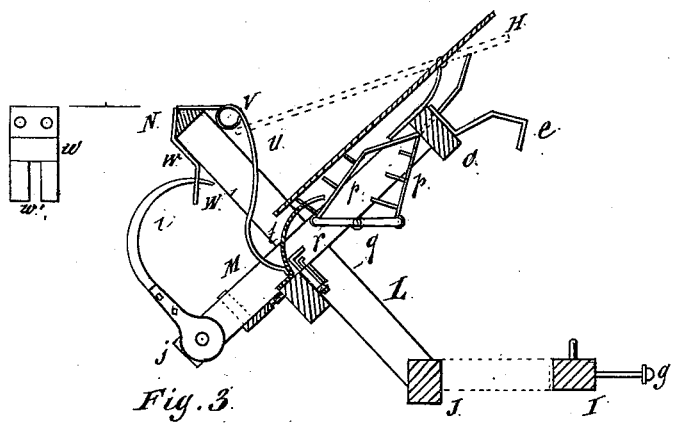
Fig. 3.
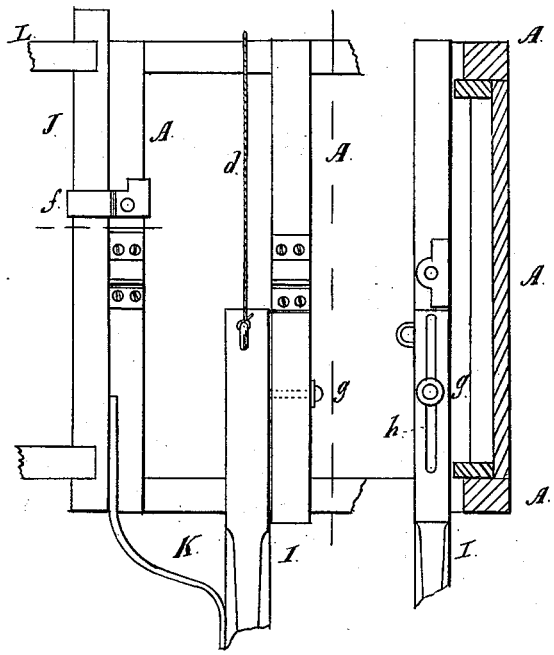
Fig. 4.
Fig. 5.
Fig. 6.
Witnesses:
Frank Dull
L. B. Wood
Inventor:
John F. Steward

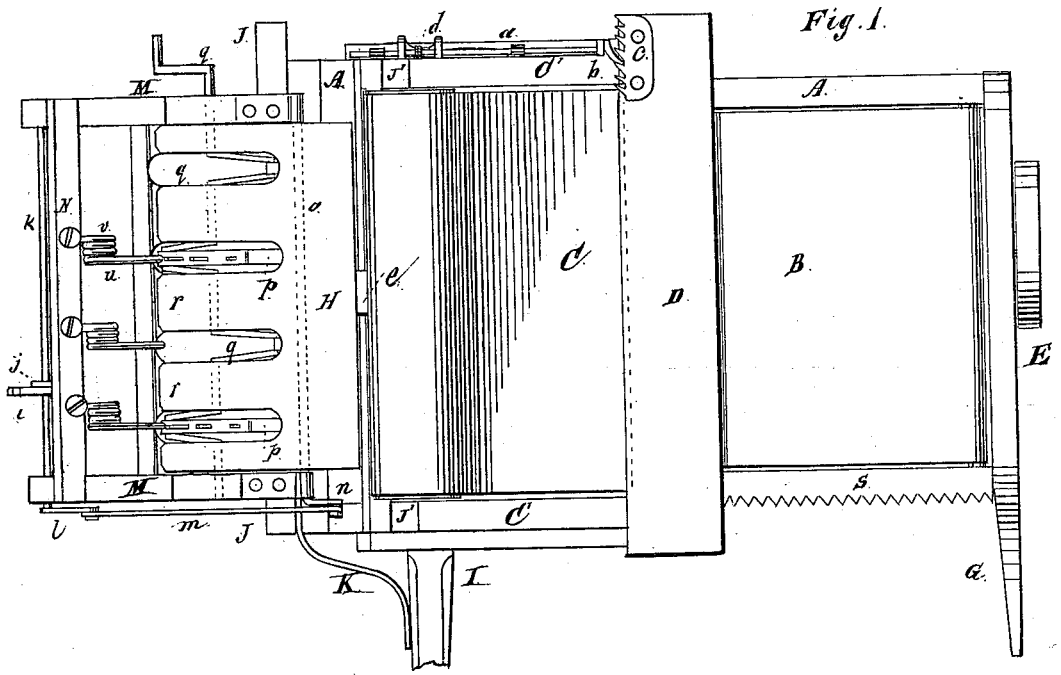

UNITED STATES PATENT OFFICE.

JOHN F. STEWARD, OF PLANO, ASSIGNOR TO ELIJAH H. GAMMON AND WILLIAM DEERING, OF CHICAGO, ILLINOIS.

IMPROVEMENT IN GRAIN-BINDERS.

Specification forming part of Letters Patent No. 191,264, dated May 29, 1877; application filed October 24, 1876.

*To all whom it may concern:*

Be it known that I, JOHN F. STEWARD, of Plano, Kendall county, State of Illinois, have invented new and useful Improvements in Harvesters, of which the following is a full description, reference being had to the accompanying drawings, in which—

Figure 1 is a top or plan view; Fig. 2, a front elevation; Fig. 3, a cross-section of the receiver and its appliances; Fig. 4, a plan view of so much of the frame-work as is operated in shifting the grain-delivery; Fig. 5, a cross-section of the frame-work, showing the attachment of the tongue; Fig. 6, a detail of the catch or loop for holding the receiver in position.

The object of this invention is to improve the construction of grain harvesting and binding machines; and its nature consists in so constructing and attaching the cutting and delivering mechanism that they may be adjusted so as to deliver the grain to the wire which is to form the band in either a fore or aft position, as the length of the straw may require; in providing an easy adjustment of the cutting and delivering devices to the receptacle; in furnishing a more perfect and effectual device for bringing the grain within reach of the binding-arm; in providing a device for compacting the grain ready for binding; in providing a device for checking the flow of grain from the delivery-apron to the binding mechanism; in providing devices for retaining the cut grain in proper position at all times while being forced into the binding-wire, and in the several parts and combination of parts hereinafter set forth and claimed as new.

In the drawings, A represents the main frame; A', the draft-sill; B, the carrier; C, the elevator; C', the elevator-frame; D, the driver's platform; E, the grain-wheel; F, the main or driving wheel; G, the divider; H, the receiving-platform; I, the tongue; J, the movable cross-bar to which the receiver is attached at its lower end; J', the cross-bar of the elevator-frame to which the receiver-frame is connected; K, the connecting bar or brace; L M, the cross-bars constituting the ends of the frame-work of the receiver; N, the cross-bar to which the retaining-springs or rods are attached; O, the upper cross-bar of the receiver; $a\,b$, the shaft and lever for shifting the delivery; $c$, the curved bar or rack for holding the lever $b$ in position; $d$, the cord or chain connecting with the rear end of the tongue; $e$, the hook upon the receiver through which the bar J' slides; $f$, the hook or catch sliding upon the bar J of the receiver-frame; $g$, the pin connected with the tongue and passing through a slot, as shown at Fig. 5; $h$, the slot; $i$, the binding-arm; $j$, the projection to which the binding-arm is attached; $k\,l$, the crank-shaft to which the binding-arm is attached; $m$, the rod for connecting the tilting platform to the needle-shaft $k$; $n\,o$, the crank-shaft for operating the platform H; $p$, the sliding bars provided with teeth which project through openings in the platform H; $q$, the crank-bar for operating the slides $p$; $r$, the twisting-hook; $s$, the sickle. $w$ is a piece of metal secured to the upper part of the binder-frame, as shown. It is provided at its lower portion with a slot, $w'$, and is so located that the needle, in its forward and return movement, will pass through this slot, which is a little wider than the width of the needle, but fitting sufficiently close to scrape or force off any straws or extraneous matter that may be caught by the needle or wire or between the two. The frame-work A C' is made in the usual manner, and is provided with a suitable carrier, B, and elevator C, and is also provided with a reel and gear for operating the sickle in the usual manner, which are not shown.

The main wheel F, grain-wheel E, and divider G are also made in any of the suitable or well-known forms.

The receiver or binder frame is most conveniently made of the X form, and the receiver and cutting and delivering parts are secured in place to each other by the hooks $e$ and $f$ and bars J and J', as shown in Fig. 2.

The tongue is attached to the bar J of the binder-frame by the bent bar or brace K, and is guided on the main frame by the pin or bolt $g$, which passes through the slot $h$ in the inner cross-bar of the main frame, on which the inner end of the axle of the main wheel is supported by suitable bearings. (Shown in Fig. 4.) The rear end of the tongue is attached to the shaft $a$ by means of the cord or chain $d$, which may run directly onto the shaft, or onto a spool connected with the shaft, as shown in Fig. 2. As shown, the bar K is rigidly attached to the bar J; but it may be pivoted thereto, if desired.

The receiving-platform H is firmly attached to the shaft or journal-bar $o$. It is provided with slots, through which the teeth on the bars $p$ protrude when elevated.

The shaft $o$ is provided with a crank, $n$, which is connected by the rod $m$ with the crank-shaft $k\ l$, so that when the binding-arm $i$ is brought down to the twister, the same movement will elevate the platform H above the teeth on the arms $p$, as shown by the dotted lines in Fig. 3.

When the binding-arm is raised the platform H returns to position, when the accumulated grain passes down against the spring-arms $u$, and is crowded through in a compact gavel by the teeth on the slides $p$.

By using independent springs, they yield according to the pressure, so that the grain is delivered to the binder in a more compact and even form than it would be by the use of a rock-shaft provided with arms or teeth to hold the grain back while the bundle is being tied.

The binding-arm $i$ and the twister $r$ are made of any of the approved forms.

The shaft $q$ is bent so as to form cranks, moving in opposite directions, whereby a portion of the arms $p$ are elevated and a portion depressed by the same movement.

The rear ends of these arms $p$ pass through slots or openings in the cross-bar O of the binder-frame, in which they slide freely, thereby doing away with the necessity of supporting or operating the rear ends by an additional shaft-crank, similar to the shaft $q$.

The shaft $q$ and the shaft $k\ l$ are operated by any suitable gearing and connections. (Not shown.)

In operation, the tongue is locked in position by the lever $b$ and rack $c$. When it is desired to deliver the grain farther back upon the receiver H, the lever $b$ is released from the rack, when the cutting and delivering parts are allowed to fall backward until the rope or chain $d$ becomes taut, when they move forward, as before. When it is desired to receive the grain farther forward, the lever $b$ is pressed backward by the driver, which again shifts the relative position of the receiver and elevator.

The grain, as it falls upon the platform H, is carried along by the inclined position of the receiver, and by the teeth on the arms $p$, which crowd it against the spring-arms $u\ v$. The shield $t$ prevents these teeth from crowding the grain down onto the twisting-hook, and also prevents short grass or grain leaves from going in to interfere with the twisting devices. The teeth on the bar $p$ crowd the grain against the spring-arms and compact the bundle, so that it is delivered to the binder in a compact form, so as to dispense with the use of a compressor.

When delivered to the tying-arm $i$ the grain is bound with wire or cord, and twisted or tied in any suitable manner, by the use of any well-known device for twisting wire or tying cord, which is located beneath the shield $t$.

The carrier and elevator operate in the usual manner.

The ordinary reel, cover for the elevator, and gearing for driving the cutting, elevating, and binding apparatus are to be applied; but their operation, being well known, need not be described.

What I claim as new, and desire to secure by Letters Patent, is as follows:

1. The sliding tongue I, in combination with and attached to a binder-frame, carrying a binding mechanism, for adjusting such mechanism to the length of the cut grain, substantially as specified.

2. The carrier B and elevator C, having a fixed position in relation to the main frame, in combination with the adjustable tongue, having a fixed position in relation to the binding mechanism, for regulating the delivery of the grain for binding, substantially as described.

3. The combination of the sliding tongue I, bent bar K, and bar J, supporting the receiver, with the pin $g$, slot $h$, chain $d$, shaft $a$, lever $b$, and rack $c$, substantially as specified.

4. The combination of the sliding arms $p$ and crank-shaft $q$ with the tilting receiving-platform H, having openings for the teeth of the arms $p$, all constructed and operating substantially as described.

5. The combination of the toothed arms $p$, slotted receiving-platform H, and the fixed spring-arms $u\ v$, for compacting the gavels, substantially as specified.

6. The separate plate W, having slot W′, attached to the frame, in combination with the needle-arm, whereby the needle-arm is cleared from straws on its upward movement, substantially as described.

JOHN F. STEWARD.

Witnesses:
FRANK LULL,
L. B. WOOD.